United States Patent [19]
Kim

[11] Patent Number: 5,415,283
[45] Date of Patent: May 16, 1995

[54] DISKETTE STORAGE BOX

[76] Inventor: Kyung-Whan Kim, 15/7, 514-14 Majang-Dong Sungdong-ku, Seoul, Rep. of Korea

[21] Appl. No.: 91,216

[22] Filed: Jul. 13, 1993

[30] Foreign Application Priority Data

Aug. 18, 1992 [KR] Rep. of Korea ............... 15500/1992

[51] Int. Cl.6 ............................................. B65D 85/57
[52] U.S. Cl. .................................. 206/309; 206/425; 206/308.3; 211/40
[58] Field of Search ........................ 206/309, 444, 425; 312/9.43, 9.44, 9.53, 9.54, 9.55, 9.47, 183; 211/40, 41

[56] References Cited

U.S. PATENT DOCUMENTS

| | | | |
|---|---|---|---|
| 1,038,841 | 9/1912 | Brown | 312/9.54 |
| 1,424,054 | 7/1922 | Wiehl | 312/9.55 |
| 2,119,407 | 5/1938 | Weiskopf | 211/41 X |
| 2,511,730 | 6/1950 | McClain | 211/41 |
| 2,628,145 | 2/1953 | Slattery | 312/9.55 X |
| 2,781,125 | 2/1957 | Mills | 206/456 |
| 3,897,871 | 8/1975 | Zinnbauer | 211/41 X |
| 4,629,067 | 12/1986 | Pavlik et al. | 206/425 |
| 4,640,416 | 2/1987 | Northrop et al. | 206/425 |
| 4,712,679 | 12/1987 | Lowe | 206/387 |
| 4,781,292 | 11/1988 | Sacherman et al. | 206/309 |
| 4,796,755 | 1/1989 | Ardenti | 206/444 |
| 4,848,574 | 7/1989 | Murphy et al. | 206/444 |

Primary Examiner—Bryon P. Gehman
Attorney, Agent, or Firm—McAulay Fisher Nissen Goldberg & Kiel

[57] ABSTRACT

A diskette storage box for keeping the diskettes therein. This storage box comprises an outer casing, which opens at an end and is provided with its bottom surface with a longitudinal through slit, a slide plate having a stopper and a contact protrusion, a diskette storage drawer being slidably inserted in the outer casing and having a longitudinal cut part for permitting the contact protrusion to be received therein and a pair of elastic protrusions for engaging with the slide plate, an inner box being enclosed in the diskette storage drawer and having a plurality of lateral bars, a locking member being elastically mounted on a front upper part of the diskette storage drawer and a front cover being mounted on the front surface of the diskette storage drawer and having a knob for handling the diskette storage drawer. The present diskette storage box safely keeps the diskettes therein and permits the diskettes to be easily sought for and repositioned, moreover, a plurality of diskette storage boxes of this invention can be vertically heaped up and, in this respect, the spacial efficiency can be improved.

17 Claims, 7 Drawing Sheets

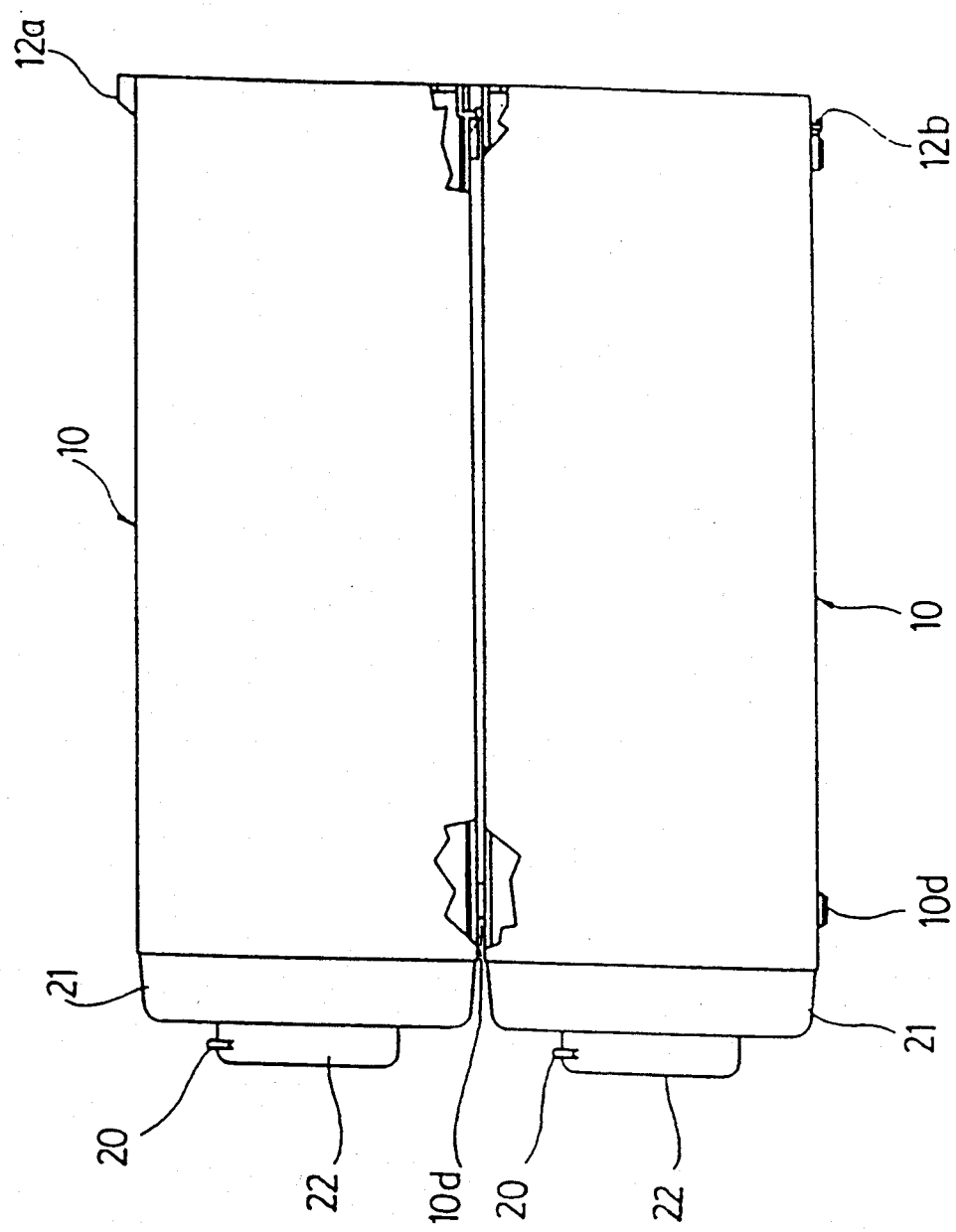

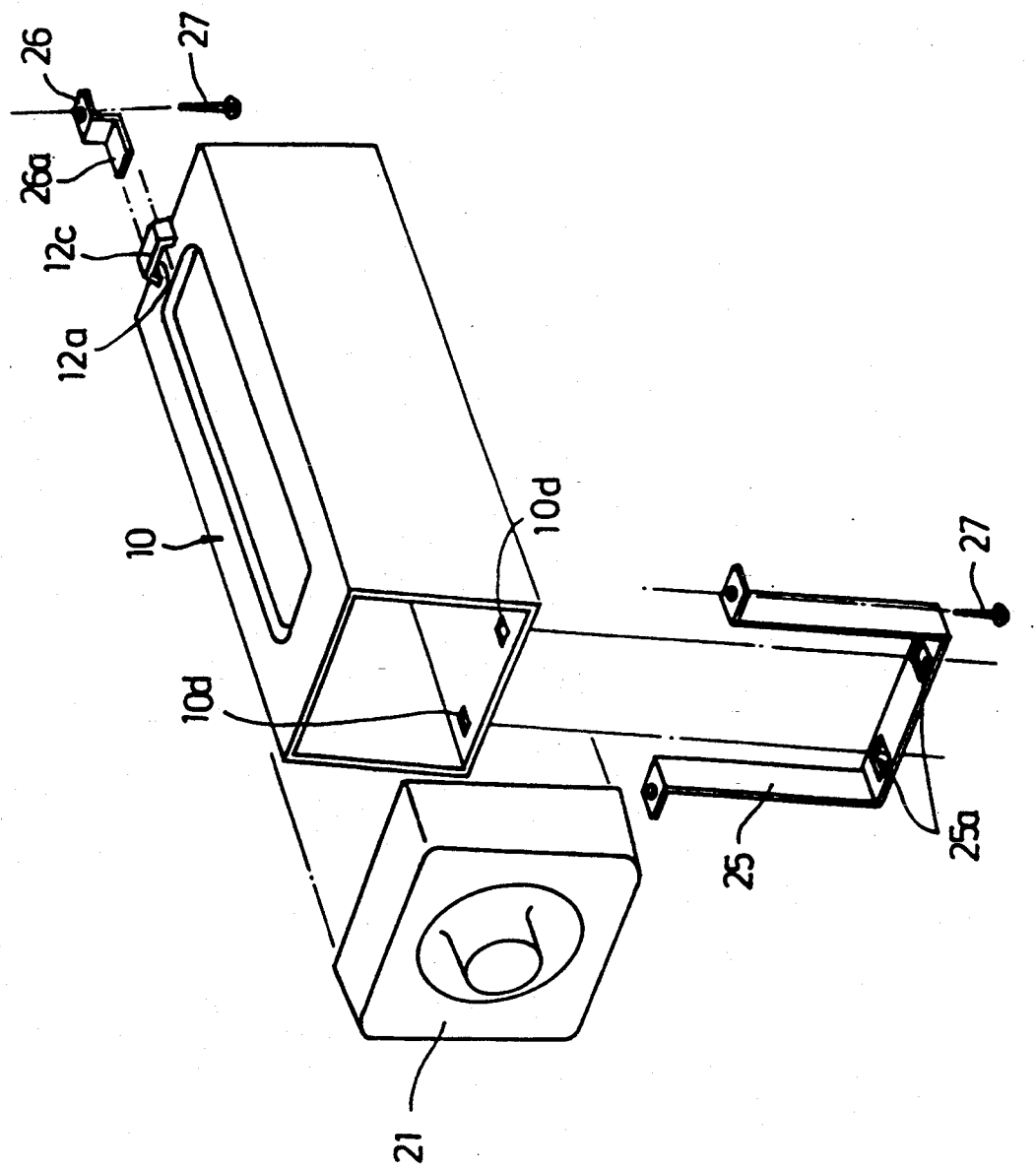

DISKETTE STORAGE BOX

BACKGROUND OF THE INVENTION

1. Field of the invention

The present invention relates in general to storage of flexible diskettes into/from which data is written and read in accordance with instructions of a computer, and more particularly to a diskette storage box which safely keeps the diskettes therein and permits a required diskette to be easily sought for and repositioned.

2. Description of the Prior Art

A conventional diskette, a sort of magnetic memory media, is prepared by coating a magnetic material on a disc made of an aluminum alloy and has a plurality of concentrical tracks into which the data is written. The data can be written into and read from the diskette by means of a magnetic head which is generally disposed above the diskette, rotating at high speed, with a minute clearance therebetween. Here, it is well known that such a diskette is required to be carefully kept as it is sensitive of temperature, moreover, the data written therein is easily broken when the diskette is in contact with a magnetic substance such as magnets, carelessly folded or gets an outer shock.

Therefore, the diskettes, particularly having data written therein, are conventionally kept in a diskette storage box. FIG. 1 shows a representative embodiment of a known diskette storage box. With reference to this drawing, this diskette storage box comprises a box-shaped outer casing 1 which is opened upwards and covered with an openable cover 4 in order to provide a diskette storage part 1a therein. The openable cover 4 is preferably made of a transparent material and hinged to opposite end sides of the casing 1 by means of hinge pins 3. In the diskette storage part 1a of the casing 1, a plurality of pivoted plate partitions 2 are detachably placed on end as pivoted by inserting their lower longitudinal protrusions into pivot slits formed on the bottom surface of the casing 1. These partitions 2 are also parallely spaced apart from each other by a predetermined interval in order to permit the diskettes D to be placed on end in the spaces between the partitions 2.

However, such a known diskette storage box does not permit the diskettes, when only a few diskettes are kept the storage box, to closely lean against the inclined partitions 2 so as to come into contact with the partitions 2 throughout its vertical length but causes the diskettes to be inclined and making contact at its uppermost end with the inclined partitions 2. Accordingly, the known diskette storage box has a disadvantage in that the diskettes, which are kept in the box under the above-mentioned inclined keeping condition, are apt to be deformed such as bent and, in this respect, the data written in the diskettes is often unwillingly broken. Moreover, in order to look for a required diskette in this known diskette storage box, it is required to manually turn over the diskettes one by one until the required diskette is rummaged out, as a result, this known diskette storage box has another disadvantage in that it inevitably causes an inconvenience when looking for the required diskette therein.

In addition, the known diskette storage box is constructed to be upwardly openable as provided with the upwardly openable cover 4, as described above, so that it is impossible to stack or pile up a plurality of boxes. Therefore, in order to use several boxes at the same time, it is required to secure a relatively wide space on which the boxes are placed, respectively, and this causes the spacial efficiency to be deteriorated.

SUMMARY OF THE INVENTION

It is, therefore, an object of the present invention to provide a diskette storage box in which the above disadvantages can be overcome and which safely retains the diskettes therein and permits the diskettes to be easily sought for and repositioned.

It is another object of the present invention to provide a diskette storage box wherein a plurality of such storage boxes can be stacked and, in this respect, improve the spacial efficiency.

In an embodiment, the present invention provides a diskette storage box comprising an outer casing which opens at an end and is provided with its bottom surface with a longitudinal through slit; slide plate means for causing said diskette to be turned over with a fan-shaped trace, said slide plate means having a stopper and a contact protrusion, said stopper downwardly extending from an under surface of the slide plate means and said contact protrusion being provided on a front upper surface of the slide plate means; a diskette storage drawer for containing said diskette, said storage drawer being slidably inserted in said outer casing and having, at its bottom surface, a longitudinal cut part for permitting said contact protrusion of the slide plate means to be received therein and, at opposite sides of said longitudinal cut part, a pair of elastic protrusions for engaging with the slide plate means; an inner box for causing the diskette to maintain its keeping position in the diskette storage drawer, said inner box being enclosed in the diskette storage drawer and having a plurality of lateral bars between which the diskette is placed on end; a locking member for causing the diskette storage drawer to be locked or released with respect to the outer casing, said locking member being elastically mounted on a front upper part of the diskette storage drawer; and a front cover being mounted on the front surface of the diskette storage drawer and having a knob for handling the diskette storage drawer.

BRIEF DESCRIPTION OF THE DRAWINGS

The above and other objects, features and other advantages of the present invention will be more clearly understood from the following detailed description taken in conjunction with the accompanying drawings, in which:

FIGS. 4A to 4C are cross sectioned views of different embodiments of a lateral bar of the diskette storage box in accordance with the present invention, respectively, in which:

FIG. 4A shows an embodiment having a diamond-shaped section;

FIG. 4B shows another embodiment having an oval-shaped section; and;

FIG. 4C shows still another embodiment having a circular-shaped section;

FIG. 7 is a side view showing a vertical stacked-up state of the diskette storage box in accordance with the present invention; and FIG. 8 is a perspective view showing the diskette storage box of the present invention in the case of being supported as suspended under a desk, but showing the state before installation.

DETAILED DESCRIPTION OF THE PREFERRED EMBODIMENTS

Figure 1:
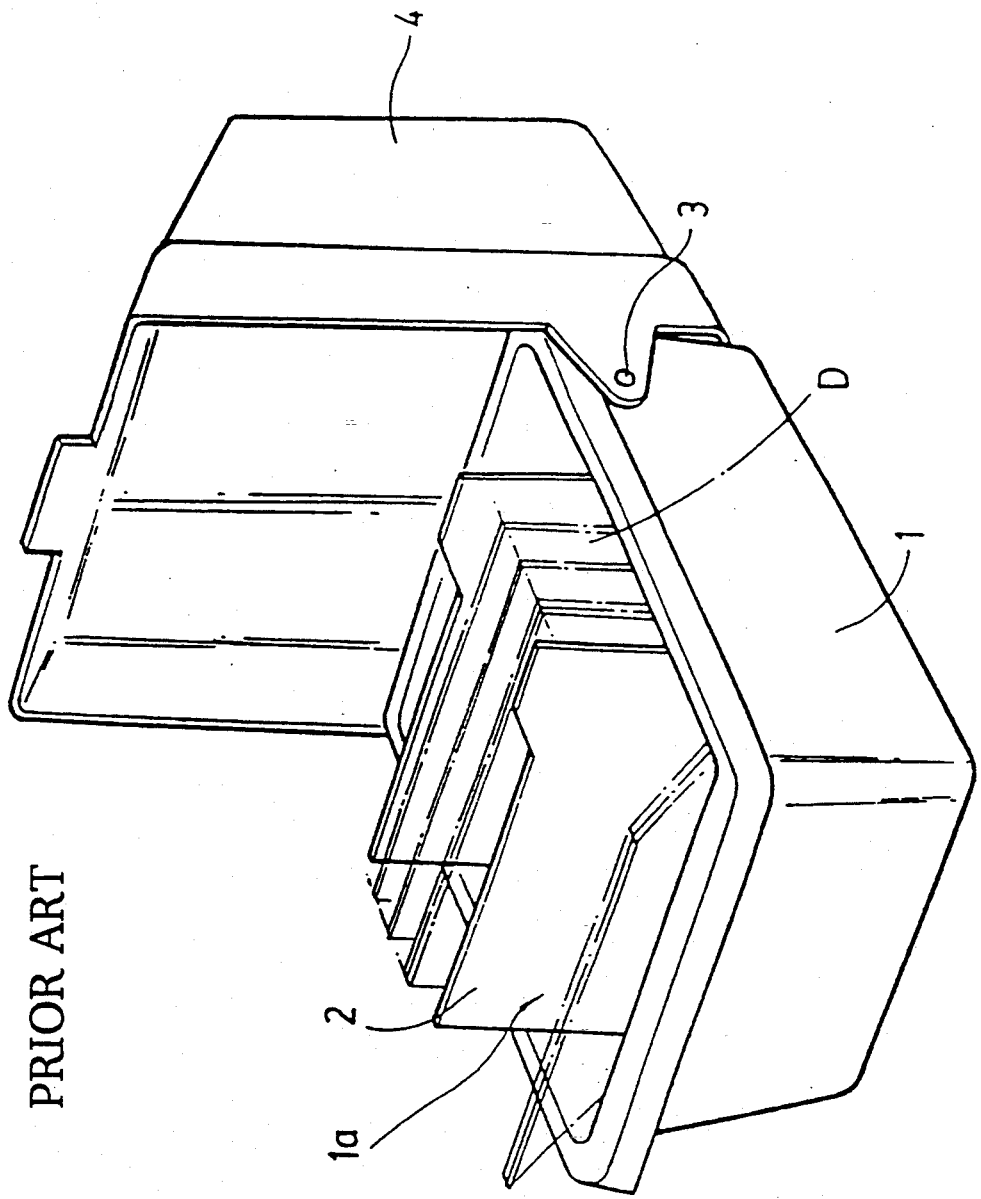
FIG. 1 is a perspective view of a known diskette storage box.
Figure 2:
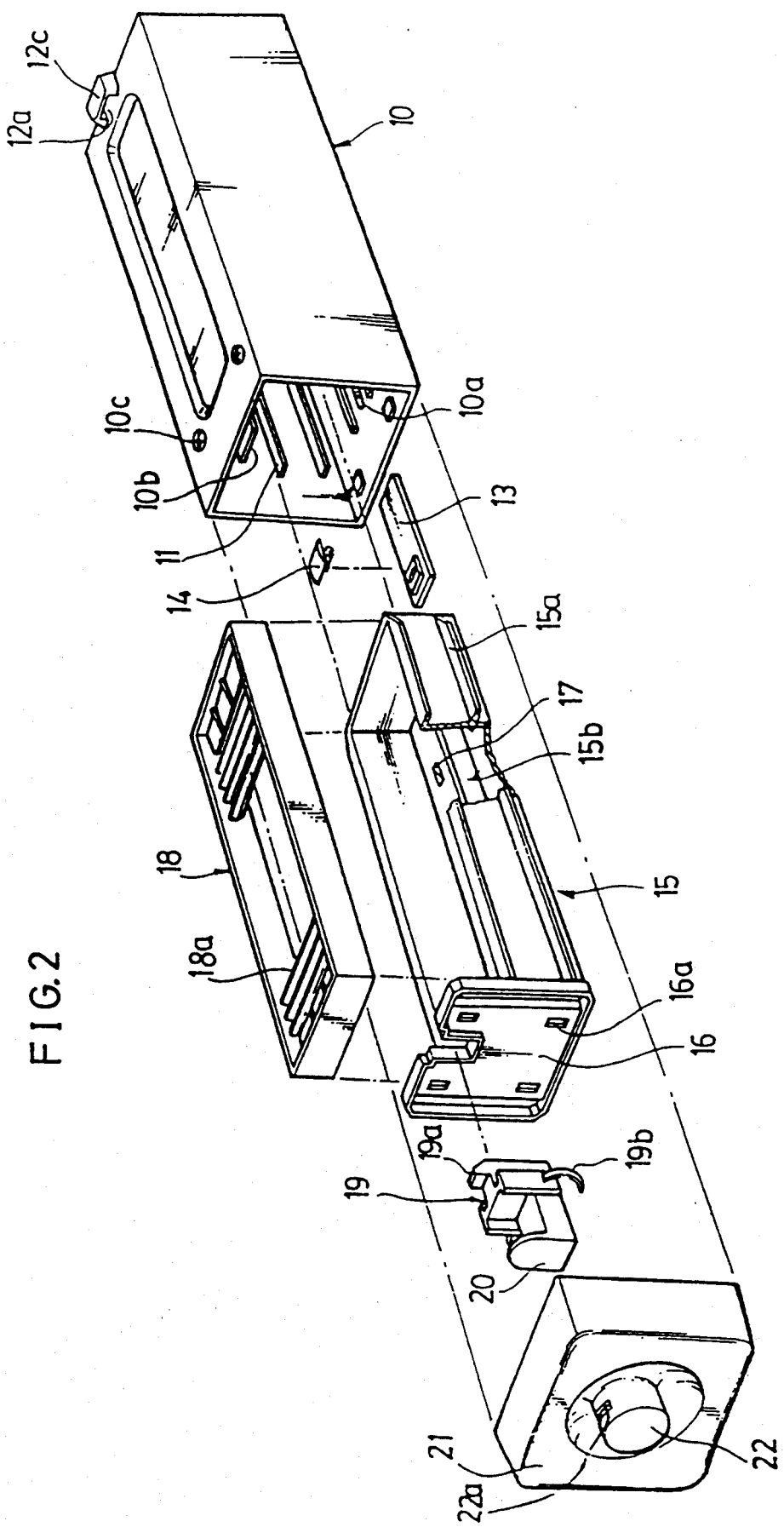
FIG. 2 is an exploded perspective view of a diskette storage box in accordance with the present invention.
Figure 3:
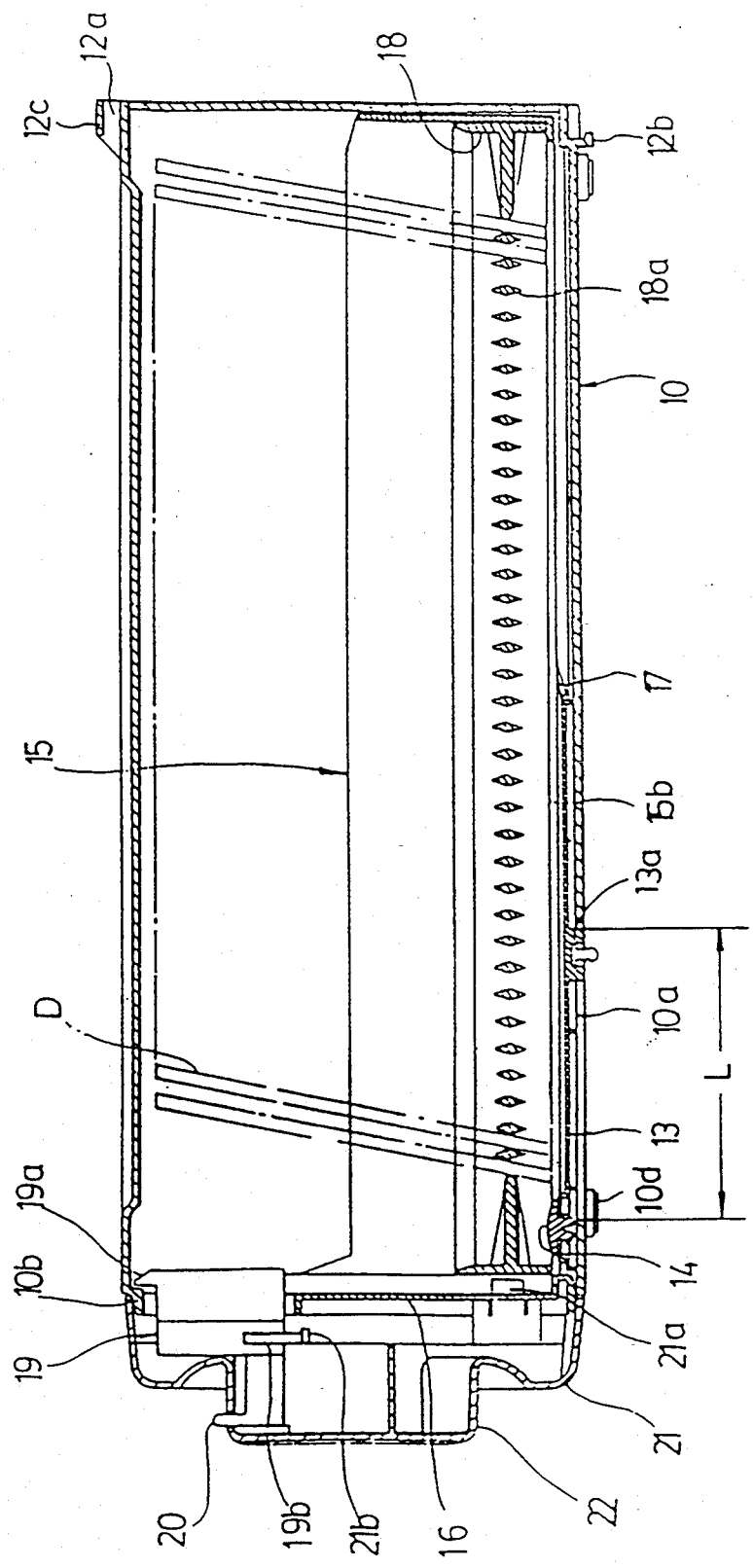
FIG. 3 is a longitudinal sectional view of the diskette storage box of FIG. 1 after assembly.

FIG. 2 shows an exploded perspective view of a diskette storage box in accordance with the present invention and FIG. 3 is a longitudinal sectioned view of the diskette storage box of FIG. 2 after assembly. With reference to these drawings, the present diskette storage box (hereinafter, referred to simply as "the storage box") comprises a box-shaped outer casing 10 which opens forwards.

This outer casing 10 is provided with a pain of longitudinal guide protrusions 11 each of which is longitudinally extending inwardly from each inner side surface of the outer casing 10. On a bottom surface of the outer casing 10, a rectangular through slit 10a is formed, while, at the upper part of the opened front end of the outer casing 10, a locking shoulder 10b is integrally provided as downwardly then outwardly extending from said upper part of the front end.

In addition, the outer casing 10 is provided, at appropriate front parts of its upper surface, with a plurality of, preferably two, engaging depressions 10c and, at an appropriate rear part of said upper surface, with an engaging slot 12a provided by an upwardly extending engaging member 12c. In order to engage with the engaging depressions 10c of the casing 10 when at least two storage boxes of this invention are piled up or stacked one above the other, the outer casing 10 is also provided with a plurality of downward protrusions 10d, which are formed at positions, corresponding to the depressions 10c, of the bottom surface of the casing 10. Similarly, an insert protrusion 12b downwardly extends from the bottom surface of the casing 10 in order to engage with the engaging slot 12a. This insert protrusion 12b also integrally extends backwards at its lower end. Because of the construction of the outer casing 10, a plurality of casings 10 can be stably stacked and this allows at least two storage boxes to be vertically stacked.

On the other hand, in the rectangular through slit 10a provided on the bottom surface of the outer casing 10, a slide plate 13 is inserted so as to be slidable in forward and backward directions. This slide plate 13 is also provided with a stopper 13a and a contact protrusion 14, the former 13a being formed as downwardly extending from the under surface of the plate 13 while the latter 14 being inserted onto a front upper surface of the plate 13. This contact protrusion 14 permits, when a required diskette D is sought for, the lower ends of the diskettes D to automatically come into contact therewith one by one, thereby facilitating the operation for seeking for the diskette.

Here, the slide plate 13 slides in forward and backward directions along the rectangular through slit 10a within a slide range provided by the predetermined length L of the slit 10a because the stopper 13a of the plate 13 is slidably inserted into the slit 10a and guided thereby. Also, in order to cause the diskette D, which contacts with the upper surface of the contact protrusion 14, to be disposed as inclined at a predetermined inclination angle, it is preferred to construct the upper surface of the contact protrusion 14 to be upwardly curved.

On the other hand, the outer casing 10 detachably encloses a diskette storage drawer 15 which slidably is inserted into the casing 10. In order to cause this storage drawer 15 to slide in the casing 10, this storage drawer 15 is provided at its side walls with a longitudinal guide rail 15a which is formed as outwardly extending from said side wall and slidably engages with a corresponding guide protrusion 11 of the outer casing 10. The storage drawer 15 also has a longitudinal cut part 15b at its bottom surface so as to permit the contact protrusion 14 of the slide plate 13 to be received therein. At the front of the drawer 15, a substantially rectangular front plate 16, having a through hole 16a at each corner thereof, is integrally formed with the drawer 15. In addition, this storage drawer 15 is provided with a pair of elastic protrusions 17 at opposite sides of the longitudinal cut part 15b. Each elastic protrusion 17 is downwardly protruded as inclined at a predetermined inclination angle so as to contact with the rear end of the slide plate 13. In result, when the storage drawer 15 slides along the guide protrusions 11, its slidable movement causes the slide plate 13 to slide along therewith.

The storage drawer 15 encloses an inner box 18 which is provided with a plurality of lateral bars 18a which are supported by opposite side walls of the inner box 18 and spaced apart from each other by a predetermined interval. On the other hand, the rectangular front plate 16 elastically engages at its upper part with a locking member 19 which causes the storage drawer 15 to be locked or released with respect to the outer casing 10.

This locking member 19 is provided at its rear upper end with a locking protrusion 19a, which intends to engage with the locking shoulder 10b of the outer casing 10, and at its opposite sides with a pair of elastic plates 19b, each of which is bent so as to provide a biasing force for the locking member 19. In addition, in order to handle this locking member 19, a push button 20 integrally forwardly extends from the front part of the locking member 19.

A front cover 21, which is mounted on the front surface of the front plate 16 of the storage drawer 15 so as to cover this plate 16, is provided with a plurality of protrusions 21a each of which is inserted into each corresponding through hole 16a of the front plate 16. In this front cover 21, a support piece 21b is provided so as to elastically support the elastic plates 19b of the locking member 19. In addition, this front cover 21 has a knob 22 for handling the storage drawer 15 when this drawer 15 is required to be moved in the forward and backward directions. This knob 22 is also provided at its upper circumferential surface with a circumferential slit 22a through which the push button 20 of the locking member 19 penetrates so as to be protruded out of the circumferential surface. In result, the locking member 19 is elastically supported by the front plate 16 of the storage drawer 15 and the front cover 21 and elastically moved upwards and downwards by virtue of the biasing force of its elastic plates 19b, thereby causing the storage drawer 15 to be automatically locked or released with respect to the outer casing 10.

As required, the knob 22 of the front cover 21 may be labelled the contents of the diskettes D, which are kept in the storage box, and this makes this storage box be used more efficiently.

Figure 4:

Turning to FIGS. 4A to 4C, it is noted that, besides the diamond-shaped section as shown in FIGS. 2, 3 and 4A, each of the lateral bars 18a of the inner box 18 may have another type of section, for example, an oval section as shown in FIG. 4B or a circular section as shown in FIG. 4C. Here, the sectional shape of the lateral bar 18a is selected so as to permit the diskette D between each two adjacent lateral bars 18a to stably maintain its inclined keeping state at a predetermined inclination angle.

The operational effect of the present diskette storage box having the aforementioned construction will be described in detail as follows.

In order to keep the diskettes D in the present diskette storage box, the diskettes D are downwardly inserted in the spaces between the lateral bars 18a so as to be inclinedly placed on end with a predetermined parallel interval therebetween. As a result, the diskettes D are efficiently prevented from being deformed and from getting an outer shock and, in this respect, safely kept in the storage box.

When this storage drawer 15 is completely inserted into the outer casing 10, the locking member 19 elastically turns downwards then upwards by virtue of the biasing force of the elastic plates 19b, supported by the support piece 21b, of the member 19 and this causes the locking protrusion 19a to elastically engage with the locking shoulder 10b of the outer casing 10. As a result, the storage drawer 15 maintains its locking state with respect to the outer casing 10 so that it is not unwillingly moved with respect to the outer casing 10.

On the other hand in order to select a required diskette D, the push button 20, which upwardly penetrates through the circumferential slit 22a of the knob 22 as described above, is downwardly pushed so as to cause the locking member 19 to elastically descend as compressing the elastic plates 19b supported by the support piece 21b and this permits the locking protrusion 19a to be released from its engaging state with the locking shoulder 10b of the outer casing 10. As a result, the storage drawer 15 can be relatively moved with respect to the outer casing 10.

At this time, the knob 22 is drawn so as to cause the storage drawer 15 to be slidably moved forwards as guided by the guide protrusions 11 of the outer casing 10. As this storage drawer 15 is moved forwards, the elastic protrusions 17 provided on the bottom surface of the drawer 15 engages with the rear end of the slide plate 13 and this causes the slide plate 13 to be moved forwardly along with the drawer 15.

Figure 5:
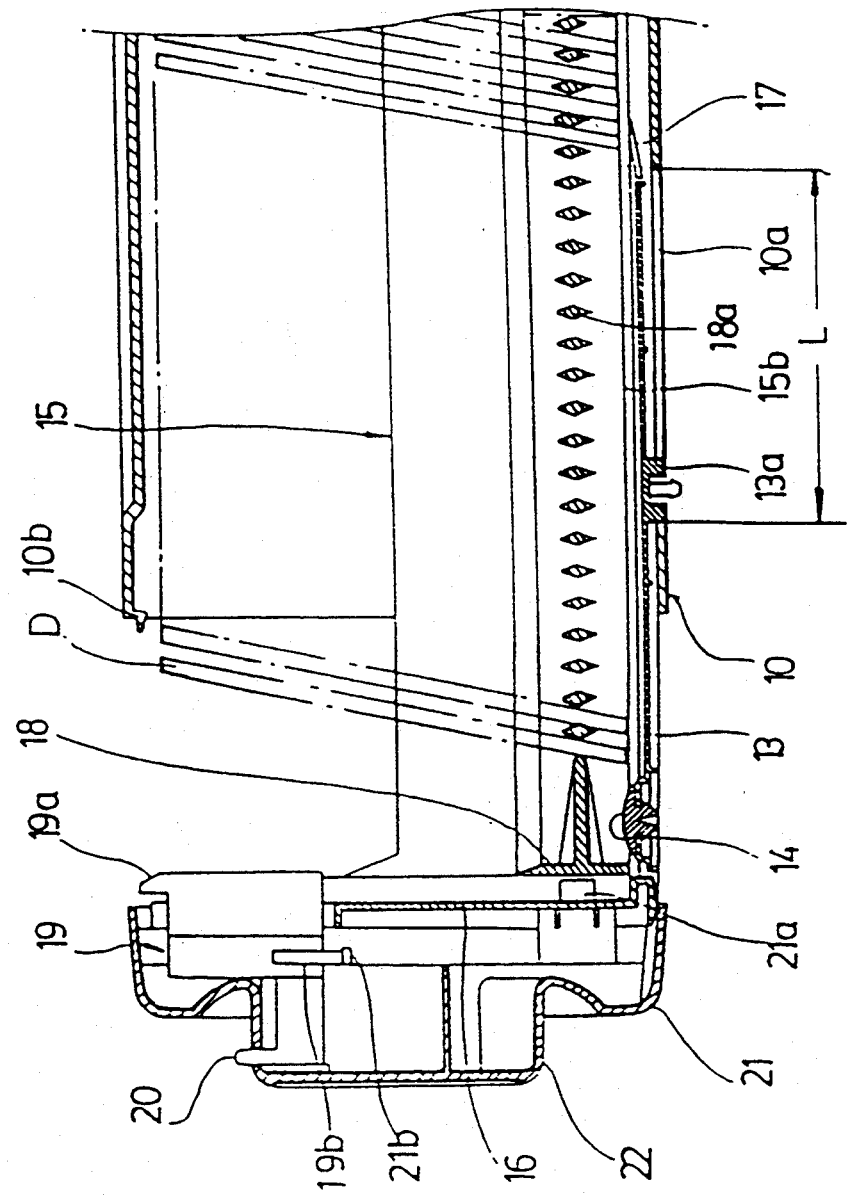
FIG. 5 is a partially longitudinal sectional view of the diskette storage box of FIG. 3 showing a first opening state of a storage drawer with respect to an outer casing.
Figure 6:
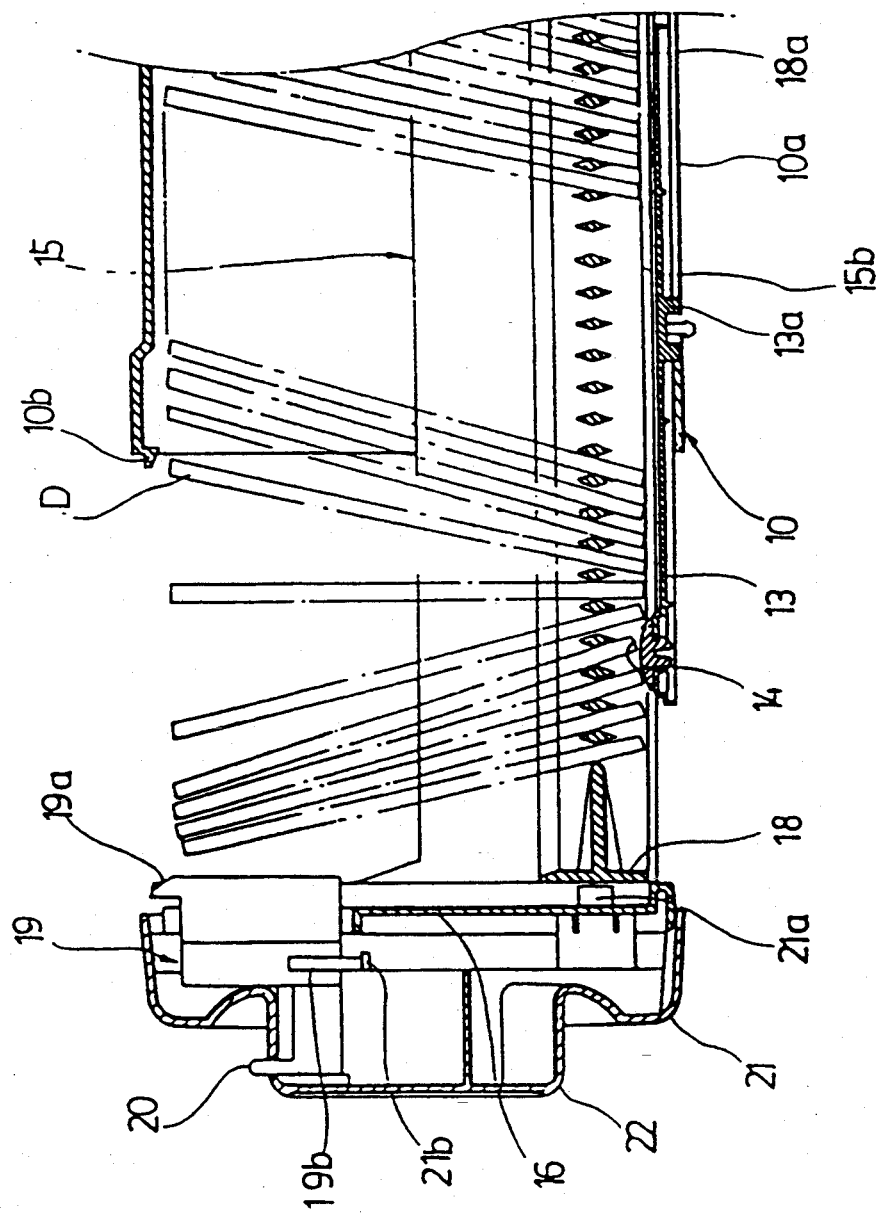
FIG. 6 is a view corresponding to FIG. 5, but showing a second opening state of the storage drawer.

That is, when the slide plate 13 is moved forwardly together with the storage drawer 15 due to its engagement with the elastic protrusions 17 of the moving storage drawer 15, the stopper 13a provided on the under surface of the slide plate 13 also slides along the rectangular through slit 10a of the outer casing 10. Here as described above, the slide plate 13 slides both in forward and backward directions along the through slit 10a within the slide range provided by the predetermined length L of the slit 10a and, in this respect, the storage drawer 15 is initially opened so as to accomplish its first opening state as depicted in FIG. 5.

Thereafter, if the storage drawer 15 is continuously drawn, the drawer 15 intends to be continuously moved forwards while the slide plate 13 inevitably stops its movement due to the limitation caused by the predetermined length L of the through slit 10a. Therefore, the elastic protrusions 17 of the drawer 15 are necessarily compressed so as to be released from their engagement with the slide plate 13 and this permits the storage drawer 15 to slide alone with respect to the outer casing 10.

At this time, because the storage drawer 15 is forwardly moved alone with respect to the outer casing 10 while the slide plate 13 stops its movement, each diskette D placed on end between each two adjacent lateral bars 18a is moved forwards as contacting at its lower end with the upper surface of the contact protrusion 14 of the slide plate 13. In result, when the storage drawer 15 is drawn, the diskettes D are automatically turned over one by one and this causes the required diskette to be easily sought for.

If described in detail, because the contact protrusion 14 has the upwardly curved upper surface as described above, each diskette D placed on end between two adjacent lateral bars 18a is turned over with a fan-shaped trace as it is forwardly moved along with the storage drawer 15 as contacting with the upwardly curved upper surface of the contact protrusion 14. Thus, it is easy to seek for the required diskette D. Particularly, as the storage drawer 15 is drawn in two steps, that is, the first and second opening steps, all of the diskettes D smoothly contact with the upper surface of the contact protrusion 14 and, in this respect, the drawing operation of the storage drawer 15 can be smoothly carried out.

In addition, if the storage drawer 15 is left as it is opened after the required diskette D is selected, the selected diskette D is, thereafter, easily repositioned in its original position and so that the user does not have to mark the original position of the selected diskette D.

Thereafter, the storage drawer 15 is moved backwards in order to be inserted into the outer casing 10, as a result, the slide plate 13 is moved backwards in order to return to its original position. At the same time, the locking protrusion 19a of the locking member 19 engages with the locking shoulder 10b of the outer casing 10 by virtue of the restoring force of the elastic plates 19b and the storage drawer 15 is prevented from being relatively moved with respect to the outer casing 10 without manual locking operation.

In addition, when it is required to use at least two diskette storage boxes in order to store a great number of diskettes, exceeding the storage capacity of one storage box, of diskettes at the same time, the present diskette storage box improves the spacial efficiency differently from the known storage box because the storage boxes of this invention can be vertically stacked one on top of another due to its characteristic construction.

In other words, in order to vertically stack a diskette storage box of this invention on top of another one, the engaging protrusions 10d provided at the front under surface of the outer casing 10 of the one box are inserted into the engaging depressions 10c provided on the upper surface of the outer casing 10 of the other box. At the same time, the insert protrusion 12b provided on the rear under surface of the outer casing 10 of the one box is inserted into the engaging slot 12a provided on the rear upper surface of the outer casing 10 of the other box. As a result, even though a plurality of diskette storage boxes are used at the same time, the present diskette storage boxes do not require to occupy respective spaces, thereby improving the spacial efficiency.

Also in order to improve the spacial efficiency, the diskette storage box of this invention can be detachably mounted on an under surface of a desk (not shown), as depicted in FIG. 8, so as to be suspended under the desk. That is, this storage box can be mounted on the under surface of the desk by means of first and second brackets 25 and 26. In order to support the storage box as suspending the outer casing 10 under the desk, the first bracket 25 stably supports the front part of the outer casing 10 by engaging its protrusions 25a with the downward protrusions 10d of the outer casing 10 while the second bracket 26 supports the rear part of the outer casing 10 by inserting its insert part 16a into the engaging slot 12a of the engaging member 12e of the outer casing 10. Here, the first and second brackets 15 and 26 are regulated on the under surface of the desk by means of set screws 27. If the storage box of this invention is supported as suspended under the desk as described above, it does not require additional area on which it is laid, thereby improving the spacial efficiency.

As described above, the present invention provides a diskette storage box in which the simple forward movement of the storage drawer permits the diskettes placed on end in the storage drawer to be turned over one by one with a fan-shaped trace as they sequentially come into contact with the upwardly curved upper surface of the contact protrusion of the slide plate and this causes the required diskette to be easily sought for. In addition, the selected diskette after being used is easily repositioned in its original position without requirement of marking the original position. As a result, the present diskette storage box causes the required time for selecting a required diskette and repositioning the selected diskette to its original position to be substantially shortened and, in this respect, it improves the business efficiency. Furthermore, when the storage drawer of the present diskette storage box is completely inserted into the outer casing of the box, it call be automatically locked in the outer casing and this causes the outer influence to the diskettes to be minimized and, in this respect, permits the diskettes to be safely kept therein. Also, it is possible to vertically stack up at least two diskette storage boxes of this invention so that the present box makes it possible to keep a great number of diskettes with occupying a minimum area on which only one diskette storage box is laid. Additionally, the present storage box can be supported by being suspended under the desk by means of additional brackets, thereby improving the spacial efficiency. In the present diskette storage box, the diskettes can be placed on end as parallel spaced from each other by a predetermined interval, thereby causing the outer influence to the diskettes to be minimized.

Although the preferred embodiments of the present invention have been disclosed for illustrative purpose, those skilled in the art will appreciate that various modifications, additions and substitutions are possible, without departing from the scope and spirit of the invention as disclosed in the accompanying claims. For example, the present invention may be applied to storage of the other types of memory media, such as compact discs, records and PC films, besides the diskettes described in the above description.

What is claimed is:

1. A diskette storage box for storing at least one diskette comprising:

an outer casing having an open end and a bottom surface having a longitudinal slit therethrough;

slide plate means for causing each stored diskette to be moved between different inclination angles, said slide plate means having a stopper and a contact protrusion for contacting each stored diskette, said stopper extending downwardly from an under-surface of the slide plate means and said contact protrusion being provided on a front upper surface of the slide plate means;

a diskette storage drawer for storing each stored diskette, said storage drawer being slidably inserted into said outer casing and having, at its bottom surface, a longitudinal cut part for receiving therein said contact protrusion and, a pair of elastic protrusions for engaging with the slide plate means positioned at opposite sides of the longitudinal cut part;

an inner box for causing each stored diskette to maintain its position in the diskette storage drawer, said inner box being positioned in the diskette storage drawer and having a plurality of lateral bars between which each stored diskette is placed on end;

a locking member for locking said diskette storage drawer with respect to the outer casing, means elastically mounting said locking member on a front upper part of the diskette storage drawer; and a front cover mounted on a front surface of the diskette storage drawer and having means for handling the diskette storage drawer.

2. The diskette storage box according to claim 1, wherein said outer casing includes engaging means for engaging the outer casing of a second diskette storage box so that the diskette storage boxes can be vertically stacked, said engaging means comprising an engaging slot provided at an upper surface of the outer casing and an insert protrusion provided at a bottom surface of the outer casing.

3. The diskette storage box according to claim 1, wherein said locking member is elastically mounted on said front cover so as to be elastically moved upwards and downwards and provided with at least one elastic plate for providing a biasing force for the locking member.

4. The diskette storage box according to claim 1, wherein said contact protrusion has an upwardly curved upper surface for causing each stored diskette to be turned over when each stored diskette is moved as contacted at a lower end thereof with said upwardly curved upper surface.

5. The diskette storage box according to claim 1, wherein each said lateral bar has a diamond-shaped section.

6. The diskette storage box according to claim 1, wherein each said lateral bar has an oval section.

7. The diskette storage box according to claim 1, wherein each said lateral bar has a circular section.

8. A diskette storage box for storing at least one diskette comprising:

a tray for storing diskettes, positioning means associated with said tray for positioning each stored diskette, said positioning means defining a first position and a second position for each stored diskette;

diskette moving means for moving each stored diskette, one diskette at a time, from the first position to the second position, said diskette moving means for acting on each stored diskette in order of arrangement in said tray to facilitate diskette identification; and, an outer casing for slidably receiving the tray, wherein the diskette moving means is connected to the outer casing for moving the stored diskettes responsive to withdrawal of the tray from the outer casing.

9. The diskette storage box of claim 8 wherein the positioning means comprises a plurality of serially arranged adjacent members, each member of said plurality of members having a first axis, a first surface and a second surface, said first surface of a first member and said second surface of an immediately adjacent second member defining a space adapted to receive a diskette, wherein a stored diskette occupies the first position when the stored diskette rests against the first surface and the stored diskette occupies the second position when the stored diskette rests against the second surface.

10. The diskette storage box of claim 9 including means for positioning said diskette moving means below said positioning means for movement of each stored diskette by contacting an end of each stored diskette inserted between two adjacent members.

11. The diskette storage box of claim 10 wherein said diskette moving means includes a slide for pivoting each stored diskette about an axis substantially parallel to said first axis.

12. The diskette storage box of claim 9 wherein the members each have a diamond-shaped cross-section.

13. The diskette storage box of claim 9 wherein the members each have an oval cross-section.

14. The diskette storage box of claim 9 wherein the members each have a circular cross-section.

15. The diskette storage box of claim 8 wherein the diskette moving means is slidably connected to the outer casing.

16. The diskette storage box of claim 8 wherein each stored diskette moving means comprises a plate having an upper surface, the upper surface having a contact protrusion for contacting the diskettes.

17. The diskette storage box of claim 16, wherein the contact protrusion has a convex contacting surface.

* * * * *